United States Patent
Rovelli

(10) Patent No.: US 6,497,292 B2
(45) Date of Patent: Dec. 24, 2002

(54) IN SITU HORSESHOEING

(75) Inventor: Frank Rovelli, Oxnard, CA (US)

(73) Assignee: Vettec, Inc., Oxnard, CA (US)

( * ) Notice: Subject to any disclaimer, the term of this patent is extended or adjusted under 35 U.S.C. 154(b) by 0 days.

(21) Appl. No.: 09/872,580

(22) Filed: May 31, 2001

(65) Prior Publication Data

US 2002/0170722 A1 Nov. 21, 2002

Related U.S. Application Data

(60) Provisional application No. 60/282,338, filed on Apr. 6, 2001, and provisional application No. 60/286,832, filed on Apr. 25, 2001.

(51) Int. Cl.⁷ .................................................. A01L 5/00
(52) U.S. Cl. .......................................................... 168/4
(58) Field of Search .............................. 168/4, 24, 45, 168/47, 48.1, DIG. 1; 59/61, 56, 36; 606/212

(56) References Cited

U.S. PATENT DOCUMENTS

| | | | | |
|---|---|---|---|---|
| 3,899,807 A | * | 8/1975 | Sovish et al. ............... 138/156 |
| 4,888,225 A | * | 12/1989 | Sandvig et al. ............... 168/12 |
| 5,199,498 A | * | 4/1993 | Knudsen ....................... 168/12 |
| 5,213,163 A | * | 5/1993 | Schaffer ......................... 168/4 |
| 5,407,620 A | * | 4/1995 | Burchette et al. ........... 264/103 |
| 5,451,629 A | * | 9/1995 | Jacobs ....................... 252/182.2 |
| 6,009,952 A | * | 1/2000 | Porteous et al. ............... 168/28 |
| 6,021,851 A | * | 2/2000 | Jacobs ............................. 168/4 |

FOREIGN PATENT DOCUMENTS

DE  29716871 U1 * 1/1999 ............. A01L/7/02

* cited by examiner

*Primary Examiner*—Peter M. Poon
*Assistant Examiner*—Son T. Nguyen
(74) *Attorney, Agent, or Firm*—Louis J. Bachand

(57) ABSTRACT

A hoof shoe formed in situ and a method for building a hoof shoe, such as a horseshoe, of an intended shape in situ are disclosed, including cleaning the surface of the shoe area of the horse hoof of debris, depositing a malleable mass of resin onto the cleaned hoof surface, supporting the resin mass until no longer malleable and shaped into an intended horseshoe shape.

37 Claims, 2 Drawing Sheets

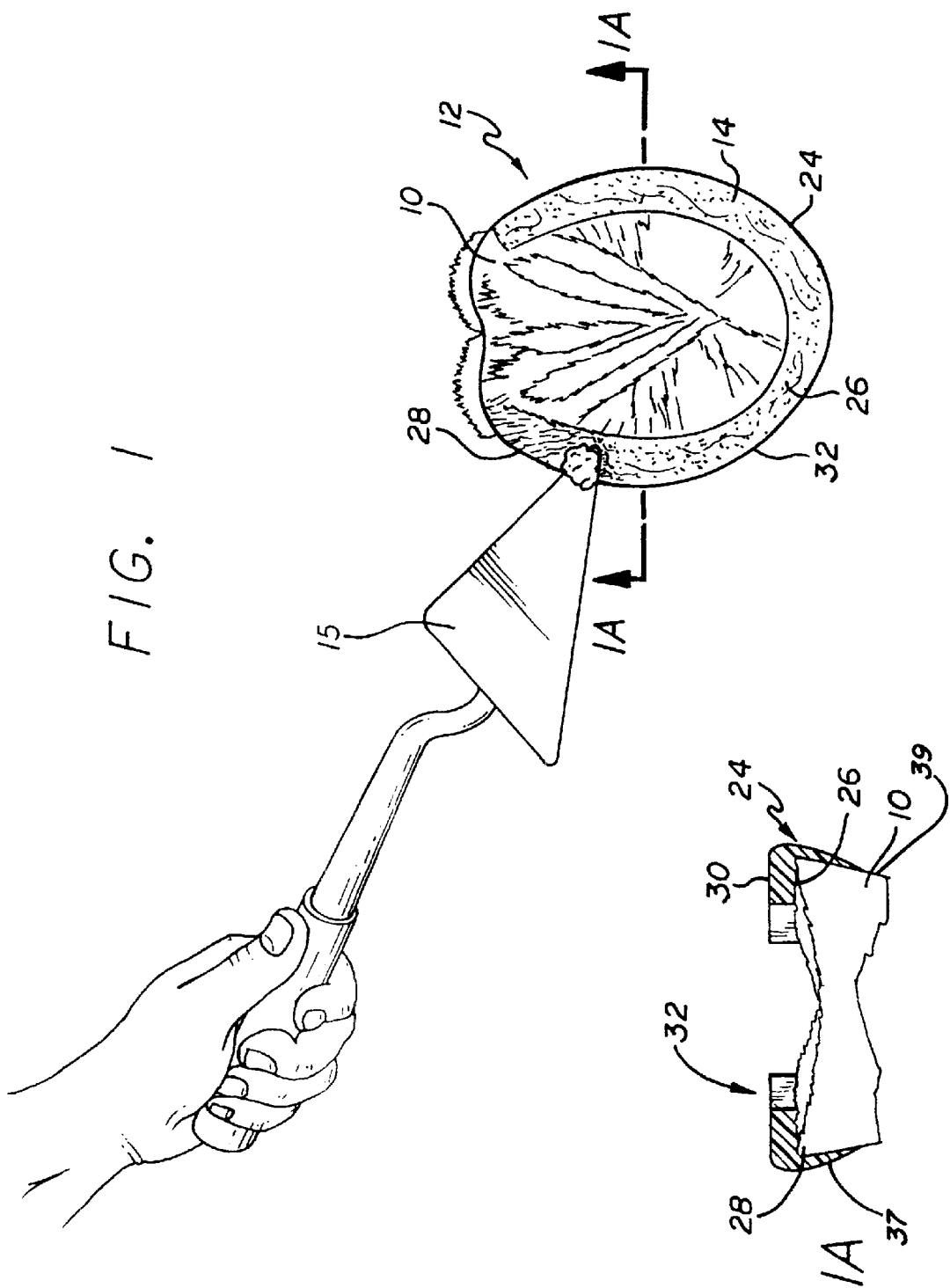

IN SITU HORSESHOEING

CROSS-REFERENCE TO RELATED APPLICATIONS

This application claims the benefit of U.S. Provisional Applications Ser. No. 60/282,338, filed Apr. 6, 2001, and Ser. No. 60/286,832, filed Apr. 25, 2001.

STATEMENT REGARDING FEDERALLY SPONSORED RESEARCH OR DEVELOPMENT

Not applicable.

REFERENCE TO A MICROFICHE APPENDIX

Not Applicable.

BACKGROUND OF THE INVENTION

1. Field of the Invention

This invention relates to revolutionizing the art of horses hoeing. More particularly, the invention relates to forming horseshoes in place, i.e. in situ, rather than fabricating the shoe away from the animal and tacking it to the hoof. More broadly, the invention relates to the addition to hoofs of various animals needing hoof protection. More particularly, the invention provides the benefits of shoeing to horses and other animals in an especially convenient and effective manner. The invention provides, for example, with respect to horseshoes, for the shoeing of horses with a resin composition that sets up instantly in situ on the horse's hoof in the near form of a horseshoe and is then trimmed to a perfect shape. The invention enables the periodic renewal of horseshoes with a minimum of effort, readily affords local variation in shoe thickness to compensate for hoof irregularities, and ensures an effective protection for the horse's hoof.

2. Description of the Related Art

Horseshoes have been fabricated of metals for centuries and more recently from synthetic materials, but always by prefabricating the shoe and then applying the prefabricated shoe onto the horse's hoof. See, for example, U.S. Pat. No. 5,699,861 to Sigafos where a kit for horses hoeing is described. The problems of prefabricated horseshoes, whether of metal or plastic is that the shape of the hoof to be shod varies making the application of a prefabricated shoe a process of trial and error, and a highly skilled and expensive to obtain art. Also, some hoofs need a thicker section in one place than in another. It is economically infeasible to market or inventory all the possibilities that may be encountered.

BRIEF SUMMARY OF THE INVENTION

What is needed is a more flexible approach, one that allows customizing of the shoes to the hoof on site without onerous or costly effort. It is accordingly an object of the invention to provide an in situ shoeing method and product. It is a further object to provide a system for the creation on the hoof itself of the shoe. It is a further object to reduce inventory requirement to merely a variously applicable resin system that is applied to the hoof in custom fashion without custom inventory. A further object of the invention is to deposit onto a prepared hoof shoeing surface a resin mass, that may comprise an intimate admixture of reactive resin components, in a profile approximating the intended shoe, that is malleable albeit non-flowing when applied, and modifiable to the desired exact contour to achieve any thickness, any thickness variation along the extent of the shoe, and of course a precise registration of the deposited resin system with the hoof contour without difficult bending of strong, prefabricated materials. It is a still further object to provide a mass resin system typically comprising A and B sides of a resin in the form of reactive thermosetting resin precursors, e.g. comprising urethane resin precursors, that is thixatroped to have a consistency allowing the resin during reaction to a formed, cured or hardened to a state to stand on the hoof shoeing surface without excessive flow off the surface. A further object is the provision of an animal or horse shoe of an intended profile comprising the resin mass in substantially the intended profile in situ on a horse hoof surface, more particularly a synthetic organic resin horseshoe formed in situ on a horse hoof surface, and the combination of a horse having a hoof, and a synthetic organic resin horseshoe attached to said hoof, the horseshoe having been formed in situ from the resin mass on the horse hoof. Other objects include: forming while shoeing a moisture barrier on the hoof surface, through the adhesion of the applied resin mass to the hoof surface material; providing a repair system for shoed hooves by addition of more resin mass where wear has occurred, which is effective because the resin mass in many embodiments will adhere to its previously cured self; preventing the horse from pulling a shoe, i.e. removing a shoe on an adjacent hoof with another hoof through a purchase gained at the so-called lip protruding rearwardly from the conventional horseshoe by eliminating the lip protrusion altogether with careful tailoring of the shoe so as to be narrow on the hoof; equalizing pressure on the hoof all about the hoof surface as an improvement over the use of nails which become as many as seven or more points of pressure; enabling shoeing of horses whose hooves are worn too much to tolerate nailing, but will accept a shoe formed in situ; adding spring to the horse's step through the resiliency of the in-situ-formed horseshoe, the profile of which can be modified to add a spring function; improving traction by customizing the shoe bottom surface to the anticipated terrain; adding color at the shoe, bodily or in accents, or other optical effects including patterns and glitter to reflect the stable that trained the horse, or a cause or event; and to have or provide a layer of resiliency at the hoof for comfort and longevity of the horse.

These and other objects of the invention to become apparent hereinafter are realized in the method for building a horseshoe of an intended shape in situ, including cleaning the surface of the shoe area of horse hoof of debris, shaping a temporarily generally malleable mass of resin on the cleaned hoof surface into generally a horseshoe-shape, and locally modifying the exposed surfaces of the horseshoe mass to conform to the final intended horseshoe shape on the shoe area surface after general malleability in the resin is lost, and the horseshoe product of the method.

In this and like embodiments, typically, the resin selected is one that self-adheres to the shoe area surface, and there is included also precoating the shoe area surface under the mass with a thin layer of the mass or similar resin having less than 25% of the depth of the intended horseshoe shape, selecting as the resin a reaction product of thermosetting resin precursors, selecting as the resin precursors thermosetting urethane resin precursors.

In a further embodiment, the invention provides a method for building a horseshoe of an intended shape in situ, including cleaning the surface of the shoe area of horse hoof of debris, applying a preshaped mass of resin on the cleaned hoof surface in generally a horseshoe-shape, and precoating the surface with a resin acting to bond the shaped mass to the surface before application of the shaped mass, and the product of the method.

In this and like embodiments, typically, the method further includes locally reshaping the horseshoe mass to conform to the intended horseshoe shape on the shoe area surface, selecting as the precoating resin the same resin as the shaped mass resin.

The invention further provides in combination, the indicated preshaped mass a resin adhesive adhering the mass of resin to the surface, the resin adhesive being distributed on the surface.

In a further embodiment, the invention provides a method for building a horseshoe of an intended shape in situ, including cleaning the surface of the shoe area of a horse hoof of debris, collecting an unconfined malleable resin mass beyond the shoe area surface, applying the mass onto the cleaned hoof surface in a generally horseshoe-shaped form, and then locally modifying the exposed surfaces of the horseshoe mass to conform to the final intended horseshoe shape on the shoe area surface.

In this and like embodiments, typically, the method further includes selecting as the resin mass a mass that self-adheres to the shoe area surface, and selecting as the resin mass a mass comprising a mixture of thermosetting resin precursors, such as thermosetting urethane resin precursors.

In a further embodiment, the invention provides a method for building an animal shoe of an intended shape in situ, including cleaning the surface of the shoe area of debris, depositing onto the cleaned hoof surface a flowable shoe preform comprising a resin mass having a depth and width of profile generally conforming to the intended shoe shape in the shoe area surface adhering relation, reducing the mass to a non-flowable state to retain substantially all the mixture on the shoe area surface, and then locally mechanically modifying the mass to modify its profile to conform to the final intended shoe shape on the shoe area surface.

As in previous embodiments, in this and like embodiments, typically, the method includes selecting as the mass a mass that self-adheres to the shoe area surface, selecting as the mass a mass that comprises reactive resin precursors in intimate admixture in a common vessel, the mass being reduced to a nonflowable state by reaction of the precursors, such as thermosetting resin precursors, e.g. thermosetting urethane resin precursors such as diphenylmethane diisocyanate, polyol, a thixatroping amine, such as a thixatroping primary or secondary amine, like meta xylene diamine.

The invention further includes the products of the foregoing methods.

In a further embodiment, there is provided a method for building a horseshoe in situ including cleaning the surface of the shoe area of horse hoof of debris, depositing onto the cleaned hoof surface a flowable horseshoe perform comprising an intimate curable mixture of urethane resin precursors comprising diphenylmethane diisocyanate and a polyoxyproplyene oxide polyol and meta xylene diamine at a depth and width profile greater than the intended horseshoe shape at a viscosity to remain on the surface, curing the mixture to a non-flowable mass in less than one minute, and shaping the horseshoe preform to reduce its profile to a final intended horseshoe shape on the surface, and the product thereof.

Other products of the invention include a horseshoe of an intended profile, the horseshoe comprising a resin mass formed in substantially the intended profile in situ on a horse hoof surface, suitably formed of a synthetic organic resin, the combination of a horse having a hoof, and a synthetic organic resin horseshoe attached to the hoof, the horseshoe having been formed in situ on the horse hoof, and the combination of: a horse having a hoof, and a synthetic organic resin horseshoe attached to the hoof, the horseshoe having been formed in situ on the horse hoof from a resin mass deposited on the hoof at a depth and width profile approximating the intended horseshoe shape.

In another aspect the invention provides a moisture-proofing of the shoed hoof surface, the method including protecting a horse hoof from moisture accumulation between shoe and hoof, including cleaning the hoof surface of debris and forming on the cleaned hoof an adherent resin mass that adheres to the hoof surface in moisture excluding relation.

In other aspects the invention provides the method of protecting a horse hoof from uneven pressure on the hoof from horseshoe, including clearing from the hoof all nails and previous shoe, and forming on the cleaned hoof an adherent resin mass that adheres to the hoof surface in shoe-forming relation, the method of maintaining a horse hoof shoe against wearing from an intended shape, including cleaning the shoe surface of debris, and restoring the intended shape to the shoe through the added application of an adherent resin mass that adheres to the hoof surface, the method of increasing the stepping comfort of a horse, including providing and maintaining as the horse hoof shoe a shoe comprising a resin having a resilience to be reduced temporarily in vertical profile when the horse puts its weight upon the shoe, and a synthetic organic resin hoof shoe hardened in situ on a hoof, the hoof-shaped resin exhibiting an optical effect other than its natural appearance.

BRIEF DESCRIPTION OF THE SEVERAL VIEWS OF THE DRAWINGS

The invention will be further described in conjunction with the attached drawings in which:

FIG. 1 is an oblique view of the troweling application of a malleable resin mass to provide a horseshoe preform onto a hoof surface;

FIG. 1A is taken on line 1A—1A in FIG. 1;

DETAILED DESCRIPTION OF THE INVENTION

Figure 3:
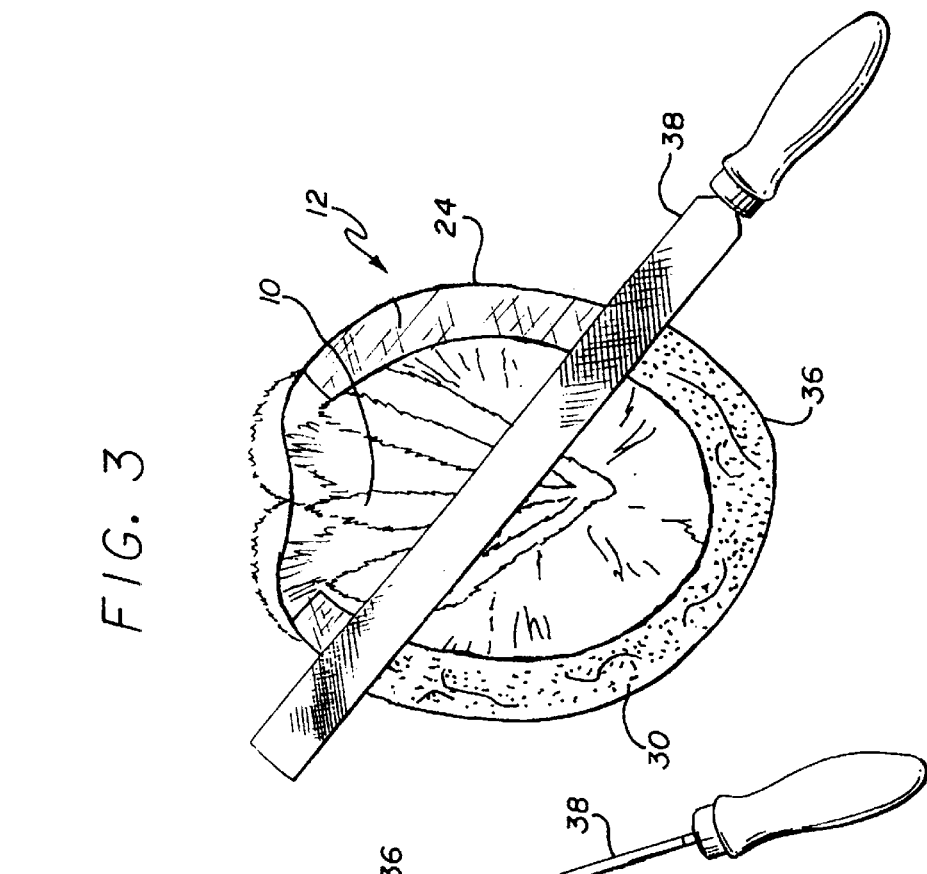

The invention provides the ultimate in shoeing convenience. A resin mass that is malleable, that is shapeable by pushing with a tool such as a hand held spatula, but so viscous and paste-like, as shown in FIG. 1, as to stand, at least temporarily, as deposited and not flow freely from the hoof surface, is deposited by trowel, by hand or other means from a mixing vessel such as a bucket onto the shoeing area of the hoof. The mass is deposited in approximately the intended shoe shape and when solidified by solvent evaporation, cure, setting up, or hardening from a more fluid state to be nonmalleable or rigid is trimmed to the intended shoe shape. The use of an in situ formed shoe eliminates the need for an inventory of various shoes, and the need for the farrior's laborious fashioning of metal to just the right form. If the hoof is less than perfect, or the horse in need of a particular kind of shoe, the amount and disposition of the resin mass can be tailored by a simple adjustment in the application steps to compensate. The invention enables the customizing of the shoe to the horse in a remarkably easy manner.

With reference now to the drawings in detail in FIGS. 1 and 1A, hoof 10 has a surface 26 defining a shoe area 28. Shoe area 28 is provided with a shoe 12 formed immediately on the hoof, i.e. in situ, from a mass 14 of resin deposited from a spatula or trowel 15 onto the shoe area 28.

The invention method for building in situ a horseshoe 12 of an intended shape 24 (shown in FIGS. 2 and 3), includes upturning the horse hoof 10 for treatment, and cleaning the surface 26 of the shoe area 28 of horse hoof of debris. A shoe preform 32 is formed on the shoe area 28 by depositing onto the surface 26 a generally malleable mass 14 of resin, shaping the paste-like resin mass into generally a shoe shape (preform 32) having a suitable depth, e.g. ½ inch, and width, e.g. 1 inch, of profile 30, see FIG. 1A. Preform profile 30 generally conforms to the intended horseshoe shape 24. Suitably, the mass 14 self-adheres, as with a urethane resin, or is made to adhere through the use of adhesives, to the shoe area surface 26. The mass 14 loses malleability through loss of solvent, cooling in the case of a hot melt resin mass, curing or hardening under any of various regimes including cure by moisture, heat, light, catalysts, etc., suitably at ambient temperatures, preferably of 65 to 85 degrees ° F. for the thermosetting resin system exemplified below. Mass 14 having the profile 30 of the preform 32 can harden or cure to a non-malleable form 36 by the just mentioned processes or by reaction of the resin precursors before substantial portions of the mass 14 flow from the profile 30 shape. In some cases the mass 36 is deliberately extended as a skirt 37 to cover the immediately adjacent hoof areas 39 beyond the hoof surface 26.

Figure 2:
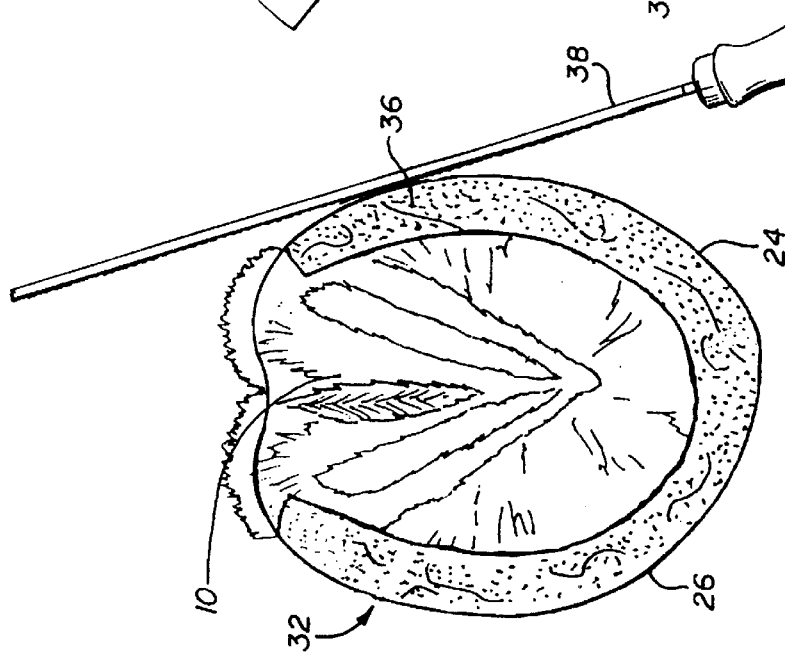
FIG. 2 is a plan view of the cured hoof shoe preform being modified to its intended shape; and, FIG. 3 is a view like FIG. 2 showing further modification of the hoof shoe.

Following loss of malleability, which is accomplished in one or two minutes, or faster, such as 30 seconds, the preform 32 is locally shaped with a rasp 38 or other tool to have the intended shoe shape 24 with the surface finish and perimeter contour desired, see FIGS. 2 and 3.

Epoxy, vinyl ester, acrylic, polyester, and other resins formulations that set up or cure quickly without animal damaging exotherms, that are tough, that are hoof adherent or adherable to the hoof through intermediary adhesives, and are otherwise suitable are likely candidates for use in the invention, in addition to the urethane resins mentioned herein. Suitable resin systems herein are resins having the requisite strength and forming properties and include, among thermosetting resins, epoxy resins, vinyl ester resins, such as the auto-cure or light-cure resin products of diacrylates, and dimethacrylates of Bisphenol-A ethoxylate resins, corresponding bis-F resins, the auto-cure or light-cure resin products of acrylic functionality, unsaturated polyester resin oligomers, including those based on the condensation products of maleic and phthalic anhydrides or acids of glycols, polyester resins in combinations of monomers including styrene, divinylbenzene, ethyl acrylate, methylmethacrylate, and other acrylates, and auto-curing resins above that are catalyzed by various peroxides and promoted by various amines. Thermoplastics such as polyamides, acrylonitrile butadiene styrene polymers, polycarbonates, polyphenylene oxides, polysulfones, polyphenylene sulfides, and fluoropolymers can be used where the strength and other properties are adequate to horseshoe use.

Preferred are polyurethane polymers, thermosetting synthetic organic resins formed from A and B sides comprising reactive component precursors of the resin. Such resins cure rapidly, are low in shrinkage, are hard and tough, are formable with tools such as rasps in less than two minutes, preferably, do not have excessive exotherms that might injure or discomfort the animal, and self-adhere to the surface 26. Preferably, these resins are reaction products of reactive precursors that can be mixed simply as reactive resin precursors to an intimate admixture. Preferred urethane resins are formed from reactive precursors of diisocyanates, e.g. aliphatic, and preferably aromatic diisocyanates, on one side and polyols, either aliphatic or aromatic polyols, on the other, with other additives that act as coupling agents, such as silanes in amounts from 0.1 to 5% by weight, that extend the polymer chains, add thixatropy, such as amines, and/or fumed silicas, that catalyze the reaction. Preferred urethane resins include thixatropic compositions having the side A reactive resin precursor diphenylmethane diisocyanate and as the side B reactive resin precursor polyoxypropylene oxide polyether polyols and meta xylene diamine, a coupling agent such as one or more silanes at about 3% by weight of the reaction mixture, Quadrol, for improved snap and rasping qualities, and thixatroping agents.

If desired, there can be a precoating of the shoe area surface with a thin layer of the resin mass 14, typically having less than 25% and as little as 5 to 15% of the profile 30 depth of the intended horseshoe shape 24. Such a lesser mass of reactants will have a lower exotherm than the full profile depth, assuming the same reactants. The thin layer is at least partially cured before depositing additional mass 14 onto the thin layer.

Further details on suitable urethane resins prepared from one or more isocyanates, catalysts, various polyols, and amines are disclosed in U.S. Pat. No. 4,869,400, the disclosure of which is hereby incorporated herein, provided the foregoing criteria are met.

EXAMPLE

A reactive urethane resin mixture typically useful in the invention is prepared from two parts (A and B sides) of equal volume in a suitable vessel such as a bucket, or in a dual cartridge dispenser in which dual pistons on a common yoke extrude the separate reactive components through a manifold and into a mix tip comprising a series of baffles arranged to cut and recombine the mixing materials as they progress through the mix tip. All parts and percentages are by weight:

| Component | Percent |
| --- | --- |
| Part A | |
| Isocyanate Prepolymer (Rubinate 1660 or MDI) | 78. |
| D.B. Castor Oil | 21. |
| Silane (Silquest A-1310) | 1. |
| Silane A-187 | 2. |
| Part B | |
| Polyol (Multranol 3901) | 54. |
| Polyol (Multranol 4012) | 26. |
| Quadrol (N'N'N'N'-tetrakis(2-hydroxyethyl or propyl ethylene diamine) | 18. |
| MXDA (1,3-benzene diamino methane) | 2.6 |
| Catalyst (Coscat 83) | 0.25 |

The reaction mass comprising the above sides mixed together is applied by trowel onto the horse hoof that has been cleaned and otherwise prepared to receive the in-situ horseshoe.

The invention thus provides a method for building a horseshoe of an intended shape in situ, using a malleable resin mass as the horseshoe preform, the mass having a depth and width of profile generally conforming to the intended horseshoe shape, adhering the mixture to the shoe area surface, rendering the mass nonmalleable before substantial portions of the mixture flows from the shoe area surface, and then locally shaping the horseshoe preform to modify its deposited profile to conform to the final intended horseshoe shape on the shoe area surface. The invention further provides the product of the method and more broadly an in situ formed animal shoe in substantially the intended profile in situ on a horse hoof surface.

The foregoing objects are thus met.

I claim:

1. A method for building a horseshoe of an intended shape in situ, including cleaning the surface of the shoe area of horse hoof of debris, shaping a temporarily generally malleable mass of paste-like resin on the cleaned hoof surface into generally a horseshoe-shape, and locally modifyirig exposed surfaces of said horseshoe mass with a tool to conform to said final intended horseshoe shape on said shoe area surface after general malleability in the resin is lost.

2. The method according to claim 1, including also selecting as said resin one that self-adheres to said shoe area surface.

3. The method according to claim 1, including also precoating said shoe area surface under said mass with a thin layer of said mass having less than 25% of the depth of said intended horseshoe shape.

4. The method according to claim 1, including also selecting as said resin a reaction product of thermosetting resin precursors.

5. The method according to claim 1, including also selecting as said resin a reaction product of urethane resin precursors.

6. The horseshoe produced by the method of claim 5.

7. The horseshoe product of claim 1.

8. A method for building a horseshoe of an intended shape in situ, including cleaning the surface of the shoe area of horse hoof of debris, applying a malleable mass of paste-like resin on the cleaned hoof surface and preshaping with a tool said mass into generally a horseshoe-shape, and precoating said surface with an adhesive resin acting to bond said shaped mass to said surface before application of said shaped mass.

9. The method according to claim 8, including also locally reshaping said preshaped horseshoe mass to conform said mass to said intended horseshoe shape on said shoe area surface.

10. The method according to claim 8, including also selecting as said precoating resin the same resin as said shaped mass resin.

11. The product of claim 10.

12. In combination, the preshaped mass of resin of claim 8 and said resin adhesive adhering said horse shoe shaped mass of resin to said surface, said resin adhesive being distributed on said surface.

13. The horseshoe product of claim 8.

14. A method for building a horseshoe of an intended shape in situ, including cleaning the surface of the shoe area of a horse hoof of debris, collecting an unconfined malleable paste-like resin mass beyond said shoe area surface, applying said mass onto the cleaned hoof surface and forming said mass into a generally horseshoe-shaped form with a tool having exposed surfaces, and then locally modifying the exposed surfaces of said horseshoe mass to conform said exposed surfaces to said final intended horseshoe shape on said shoe area surface.

15. The method according to claim 14, including also selecting as said resin mass a mass that self-adheres to said shoe area surface.

16. The method according to claim 14, including also selecting as said resin mass a mass comprising a mixture of thermosetting resin precursors.

17. The method according to claim 16, including also selecting as said thermosetting resin precursors urethane resin precursors.

18. The horseshoe product of claim 14.

19. A method for building an animal shoe of an intended shape in situ, including cleaning the surface of the shoe area of debris, depositing onto the cleaned hoof surface a flowable shoe preform comprising a malleable paste-like resin mass having a depth and width of profile generally conforming to said intended shoe shape in said shoe area surface adhering relation, reducing said mass to a non-flowable state to retain substantially all said mass on said shoe area surface, and then locally mechanically modifying said mass to modify with a tool its profile to conform to said final intended shoe shape on said shoe area surface.

20. The method according to claim 19, including also selecting as said mass a mass that self adheres to said shoe area surface.

21. The method according to claim 19, including also selecting as said mass a mass that comprises reactive resin precursors in intimate admixture in a common vessel, said mass being reduced to a nonflowable state by reaction of said precursors.

22. The method according to claim 21, including also selecting as said resin precursors thermosetting resin precursors.

23. The method according to claim 22, including also selecting as said reactive resin precursors urethane resin precursors.

24. The method according to claim 23, including also selecting as a side A reactive resin precursor a precursor comprising diphenylmethane diisocyanate.

25. The method according to claim 23, including also selecting as a side B reactive resin precursor a precursor comprising a polyol.

26. The method according to claim 25, including also selecting as a side A reactive resin precursor a precursor comprising diphenylmethane diisocyanate.

27. The method according to claim 23, including also selecting as a side B reactive resin precursor a precursor comprising a thixatroping amine.

28. The method according to claim 23, including also selecting as a side B reactive resin precursor a precursor comprising a thixatroping primary or secondary amine.

29. The method according to claim 23, including also selecting as a side B reactive resin precursor a precursor comprising a thixatroping amine comprising meta xylene diamine.

30. The method according to claim 23, including also incorporating into side A and/or side B reactive resin precursors a coupling agent comprising a silane.

31. The method according to claim 30, including also adding said silane in amounts from about 0.1% to about 5% by weight in each said side where present.

32. The method according to claim 23, including also maintaining in said mass from about 3% to about 10% by weight fumed silica.

33. The method according to claim 23, including also incorporating into said mass from about 4% to about 32% by weight Quadrol.

34. The animal shoe product of claim 19.

35. A method for building a horseshoe in situ including cleaning the surface of the shoe area of horse hoof of debris, depositing onto the cleaned hoof surface a malleable mass to form a horseshoe perform, said mass comprising a paste-like an intimate curable mixture of urethane resin precursors comprising diphenylmethane diisocyanate and a polyoxyproplyene oxide polyol and meta xylene diamine deposited at a depth and width profile greater than the intended horseshoe shape and at a viscosity to remain on said surface, curing said mixture to a non-flowable mass in less than one minute, and shaping with a tool said horseshoe preform to reduce its profile to a final intended horseshoe shape on said surface.

36. The horseshoe product of claim 35.

37. A method for building a horseshoe of an intended shape in situ, including cleaning the surface of the shoe area of horse hoof of debris, depositing onto said surface a temporarily generally malleable mass of paste-like resin that does not have a horseshoe shape, and locally modifying the exposed surfaces of said mass to conform said mass to said intended horseshoe shape on said shoe area surface before general malleability in the resin is lost.

* * * * *